United States Patent
Xiao

(10) Patent No.: US 9,619,503 B2
(45) Date of Patent: Apr. 11, 2017

(54) METHOD, SERVER, AND SYSTEM FOR ACCESSING METADATA

(71) Applicant: TENCENT TECHNOLOGY (SHENZHEN) COMPANY LIMITED, Shenzhen, Guangdong (CN)

(72) Inventor: Pin Xiao, Shenzhen (CN)

(73) Assignee: Tencent Technology (Shenzhen) Company Limited, Shenzhen, Guangdong (CN)

( * ) Notice: Subject to any disclaimer, the term of this patent is extended or adjusted under 35 U.S.C. 154(b) by 0 days.

(21) Appl. No.: 15/101,777

(22) PCT Filed: Feb. 13, 2015

(86) PCT No.: PCT/CN2015/072979
§ 371 (c)(1),
(2) Date: Jun. 3, 2016

(87) PCT Pub. No.: WO2015/090244
PCT Pub. Date: Jun. 25, 2015

(65) Prior Publication Data
US 2016/0314157 A1     Oct. 27, 2016

(30) Foreign Application Priority Data
Dec. 19, 2013  (CN) .......................... 2013 1 0706160

(51) Int. Cl.
*G06F 17/30* (2006.01)
*G06F 21/62* (2013.01)

(52) U.S. Cl.
CPC .. *G06F 17/30339* (2013.01); *G06F 17/30545* (2013.01); *G06F 17/30575* (2013.01); *G06F 21/6227* (2013.01)

(58) Field of Classification Search
CPC ......... G06F 17/30339; G06F 17/30545; G06F 17/30864; G06F 17/30949; G06F 21/00;
(Continued)

(56) References Cited

U.S. PATENT DOCUMENTS 7,937,407 B2 * 5/2011 Goto .................... G11B 27/105
                                                          707/783
8,825,703 B2 * 9/2014 Ohtake ............. G06F 17/30557
                                                          707/781
(Continued)

FOREIGN PATENT DOCUMENTS

CN            1700635 A    11/2005
CN         101067822 A    11/2007
(Continued)

OTHER PUBLICATIONS

International Search Report for PCT/CN2015/072979, ISA/CN, Haidian District, Beijing, mailed May 28, 2015.
(Continued)

*Primary Examiner* — Greta Robinson
(74) *Attorney, Agent, or Firm* — Harness, Dickey & Pierce, P.L.C.

(57) ABSTRACT

A method for accessing metadata includes: receiving an authentication information query request from a query engine, and sending the authentication information query request to a global database server; receiving authentication information from the global database server; sending the authentication information to the query engine so that the query engine determines, according to privilege authentication result of the authentication information, whether to access table information. A corresponding server and system are also disclosed. By storing authentication information in global database server and storing table information in one or more segment database servers, distributed storage of metadata is achieved; the metadata accessing server obtains
(Continued)

from the global server the authentication information queried by the query engine and obtains from the segment database server the table information queried by the query engine, which reduces metadata access time and increases the speed of sharing and exchange of information in a distributed data warehouse.

13 Claims, 11 Drawing Sheets

(58) Field of Classification Search
CPC .. G06F 21/62; G06F 21/6209; G06F 21/6218; G06F 21/6227; G06F 21/6245; G06F 21/64
USPC ........ 707/747, 783, 784, 785, 786, 787, 788
See application file for complete search history.

(56) References Cited

U.S. PATENT DOCUMENTS

| | | | |
|---|---|---|---|
| 8,914,632 B1* | 12/2014 | Shankar | H04L 63/101 713/167 |
| 2005/0234907 A1 | 10/2005 | Yamagishi et al. | |
| 2007/0156763 A1* | 7/2007 | Liu | G06F 17/30067 |
| 2007/0260592 A1 | 11/2007 | Anglin et al. | |
| 2012/0047162 A1* | 2/2012 | Guglietti | G06F 21/6227 707/769 |
| 2013/0218934 A1 | 8/2013 | Lin et al. | |
| 2014/0075514 A1* | 3/2014 | Prasad | G06F 21/78 726/4 |
| 2014/0280372 A1* | 9/2014 | Huras | G06F 17/30584 707/803 |

FOREIGN PATENT DOCUMENTS

| | | |
|---|---|---|
| CN | 101196929 A | 6/2008 |
| CN | 103095687 A | 5/2013 |
| CN | 103198153 A | 7/2013 |
| CN | 103218433 A | 7/2013 |
| CN | 104090897 A | 10/2014 |

OTHER PUBLICATIONS

CN Office Action for CN 201310706160.3 with concise explanation of relevance.

Tuhahe, "BiG data Open Day-Shenzhen—the Reconfiguration Scheme and Effect Display of Metadata—Xiao, Pin" http://share.csdn.slides/4216, p. 8, May 20, 2014 (May 20, 2014).

* cited by examiner

METHOD, SERVER, AND SYSTEM FOR ACCESSING METADATA

CROSS-REFERENCE TO RELATED APPLICATIONS

This application is a 371 U.S. National Stage of International Application No. PCT/CN2015/072979, filed Feb. 13, 2015, which claims the benefit of and priority to Chinese Patent Application No. 201310706160.3, filed Dec. 19, 2013. The disclosures of the above applications are incorporated herein by reference.

FIELD OF THE DISCLOSURE

The present disclosure relates to database techniques, and more particularly, to a method, a server and a system for accessing metadata.

BACKGROUND OF THE DISCLOSURE

With the advent of the era of massive data, more and more data needs to be stored. Meanwhile, Data Warehouse (DW) used for storing data has developed into distributed data warehouse based on multiple storage devices from that based on a single storage device. The distributed data warehouse is a large scale distributed system, including multiple databases and each database includes multiple tables. It operates based on metadata. The metadata is data about the data warehouse. It is key data generated during the construction of the data warehouse relevant to data source definition, target definition, conversion rule, etc., including authentication information and table information. Therefore, the metadata of the data warehouse consists of the metadata of each database, the metadata of each table and other data. For example, the metadata of a particular database of the data warehouse includes authentication information of the database and table information of the database, wherein the authentication information describes privilege information for the database and the table information describes structure and creation manner of the data in the database. Therefore, the method for accessing the metadata affects the sharing and exchanging of the information in the distributed data warehouse and therefore affects the performance and expandability of the distributed data warehouse.

SUMMARY OF THE DISCLOSURE

Embodiments of the present disclosure provide a method, a server and a system for accessing metadata, so as to realize distributed storage of the metadata. The solution is as follows.

According to one aspect, a method for accessing metadata is provided. The method includes:

receiving an authentication information query request containing a metadata identifier transmitted by a query engine, and transmitting the authentication information query request to a global database server storing authentication information of metadata;

receiving the authentication information corresponding to the metadata identifier transmitted by the global database server;

transmitting the authentication information to the query engine, wherein the query engine determined whether to access table information corresponding to the metadata identifier according to a privilege authentication result of the authentication information;

wherein the table information of the metadata is stored in one or more segment database servers; and the one or more segment database servers and the global database server are different servers.

According to another aspect, a metadata accessing server is provided. The server includes:

a first receiving module, adapted to receive an authentication information query request containing a metadata identifier transmitted by a query engine;

a first transmitting module, adapted to transmit the authentication information query request received by the first receiving module to a global database server storing authentication information of metadata;

a second receiving module, adapted to receive the authentication information corresponding to the metadata identifier transmitted by the global database server;

a second transmitting module, adapted to transmit the authentication information received by the second receiving module to the query engine, wherein the query engine determines whether to access table information corresponding to the metadata identifier according to a privilege authentication result of the authentication information;

wherein the table information of the metadata is stored in one or more segment database servers, the one or more segment database servers and the global database server are different servers.

According to still another aspect, a method for accessing metadata is provided. The method includes:

receiving an authentication information query request containing a metadata identifier transmitted by a metadata accessing server, wherein the authentication information query request is transmitted to the metadata accessing server by a query engine;

searching stored authentication information for authentication information corresponding to the metadata identifier, and transmitting the authentication information corresponding to the metadata identifier to the metadata accessing server, wherein the metadata accessing server transmits the authentication information to the query engine, and the query engine determines whether to access table information corresponding to the metadata identifier according to a privilege authentication result of the authentication information;

wherein the table information of the metadata is stored in one or more segment database servers.

According to yet another aspect, a global database server is provided. The global database server includes:

a receiving module, adapted to receive an authentication information query request containing a metadata identifier transmitted by a metadata accessing server, wherein the authentication information query request is transmitted to the metadata accessing server by an query engine;

a searching module, adapted to search stored authentication information for the authentication information corresponding to the metadata identifier;

a transmitting module, adapted to transmit the authentication information corresponding to the metadata identifier to the metadata accessing server, wherein the metadata accessing server transmits the authentication information to the query engine, and the query engine determines whether to access table information corresponding to the metadata identifier according to a privilege authentication result of the authentication information;

wherein the table information of the metadata is stored in one or more segment database servers.

Embodiments of the present disclosure further provide a method for accessing metadata. The method includes:

receiving a table information access request containing a metadata identifier transmitted by a metadata accessing server, wherein the table information access request is transmitted to the metadata accessing server by a query engine; and searching for table information corresponding to the metadata identifier, and transmitting the table information to the metadata accessing server, wherein the metadata accessing server transmits the table information to the query engine.

Embodiments of the present disclosure further provide a segment database server. The segment database server includes:

a receiving module, adapted to receive a table information access request containing a metadata identifier transmitted by a metadata accessing server, wherein the table information access request is transmitted to the metadata accessing server by a query engine;

a searching module, adapted to search for table information corresponding to the metadata identifier; and a transmitting module, adapted to transmit the table information to the metadata accessing server, wherein the metadata accessing server transmits the table information to the query engine.

Embodiments of the present disclosure further provide a metadata accessing server. The metadata accessing server includes: one or more processors and a memory, one or more programs are stored in the memory and are configured to be executable by the one or more processors, wherein the one or more programs comprise instructions for performing the acts of:

receiving an authentication information query request containing a metadata identifier transmitted by a query engine, and transmitting the authentication information query request to a global database server storing authentication information of metadata;

receiving the authentication information corresponding to the metadata identifier transmitted by the global database server;

transmitting the authentication information to the query engine, wherein the query engine determined whether to access table information corresponding to the metadata identifier according to a privilege authentication result of the authentication information;

wherein the table information of the metadata is stored in one or more segment database servers; and the one or more segment database servers and the global database server are different servers.

Embodiments of the present disclosure further provide a global database server. The global database server includes: one or more processors and a memory, one or more programs are stored in the memory and are configured to be executable by the one or more processors, wherein the one or more programs comprise instructions for performing the acts of:

receiving an authentication information query request containing a metadata identifier transmitted by a metadata accessing server, wherein the authentication information query request is transmitted to the metadata accessing server by a query engine;

searching stored authentication information for authentication information corresponding to the metadata identifier, and transmitting the authentication information corresponding to the metadata identifier to the metadata accessing server, wherein the metadata accessing server transmits the authentication information to the query engine, and the query engine determines whether to access table information corresponding to the metadata identifier according to a privilege authentication result of the authentication information;

wherein the table information of the metadata is stored in one or more segment database servers.

Embodiments of the present disclosure further provide a segment database server. The segment database server includes: one or more processors and a memory, one or more programs are stored in the memory and are configured to be executable by the one or more processors, wherein the one or more programs comprise instructions for performing the acts of:

receiving a table information access request containing a metadata identifier transmitted by a metadata accessing server, wherein the table information access request is transmitted to the metadata accessing server by a query engine; and searching for table information corresponding to the metadata identifier, and transmitting the table information to the metadata accessing server, wherein the metadata accessing server transmits the table information to the query engine.

Embodiments of the present disclosure further provide a system for accessing metadata. The system includes: a metadata accessing server, a global database server and at least one segment database server, the metadata accessing server has a network connection respectively with the global database server and each of the at least one segment database server;

wherein the global database server stores authentication information of metadata, table information of the metadata is stored in the at least one segment database server, the at least one segment database server and the global database server are different servers;

the metadata accessing server receives an authentication information query request containing a metadata identifier transmitted a query engine, transmits the authentication information query request to the global database server; receives authentication information corresponding to the metadata identifier transmitted by the global database server; transmits the authentication information to the query engine, wherein the query engine determines whether to access the table information corresponding to the metadata identifier according to a privilege authentication result of the authentication information.

The technical solution provided by the embodiments of the present disclosure has the following advantages:

Through storing the authentication information of the metadata in the global database server and storing the table information of the metadata in one or more segment database servers, distributed storage of the metadata is realized. In addition, the metadata accessing server obtains the authentication information queried by the query engine from the global database server, and obtains the table information queried by the query engine from the segment database server. Thus, the time for accessing the metadata is reduced, and then the speed for sharing and exchanging information in the distributed data warehouse is increased.

BRIEF DESCRIPTION OF THE DRAWINGS

The drawings used in the description of the embodiments are briefly described hereinafter to make the technical solution provided by the embodiments of the present disclosure clearer. Certainly, the following drawings are merely some examples in the present disclosure. Those skilled in the art would obtain other drawings based on these without inventive work.

DETAILED DESCRIPTION OF THE DISCLOSURE

The preset disclosure will be described in further detail hereinafter with reference to accompanying drawings and examples to make the technical solution and merits therein clearer.

In a method for accessing metadata: after receiving an authentication information query request initiated by a query engine, a Java Data Object (JDO) interface access layer transmits the authentication information query request to a metadata storage layer; the metadata storage layer determines the corresponding metadata according to the authentication information query request, and returns the corresponding metadata to the JDO interface access layer; the JDO interface access layer returns the corresponding metadata to the query engine, then the access to the metadata is completed. The metadata storage layer stores the metadata by a traditional relational database.

The metadata storage layer stores the metadata by the traditional relational database, whereas it is difficult for the relational database to realize distributed data storage. Meanwhile, the JDO interface access layer over the storage layer does not support distributed data access. As such, all metadata of the whole distributed data warehouse has to be stored in a single database, which cannot be extended. When the amount of the metadata increases, the performance of the metadata interface may decrease, and the time for accessing the metadata may be prolonged.

In view of the above, embodiments of the present disclosure provides a solution for accessing metadata. Through storing the authentication information of the metadata in a global database server and storing the table information of the metadata in one or more segment database servers, the distributed storage of the metadata is realized. In addition, the metadata accessing server obtains the authentication information queried by the query engine from the global database server and obtains the table information queried by the query engine from the segment database server. As such, the time for accessing metadata is reduced, and then the speed for sharing and exchanging the information in the distributed data warehouse is increased.

Figure 1:
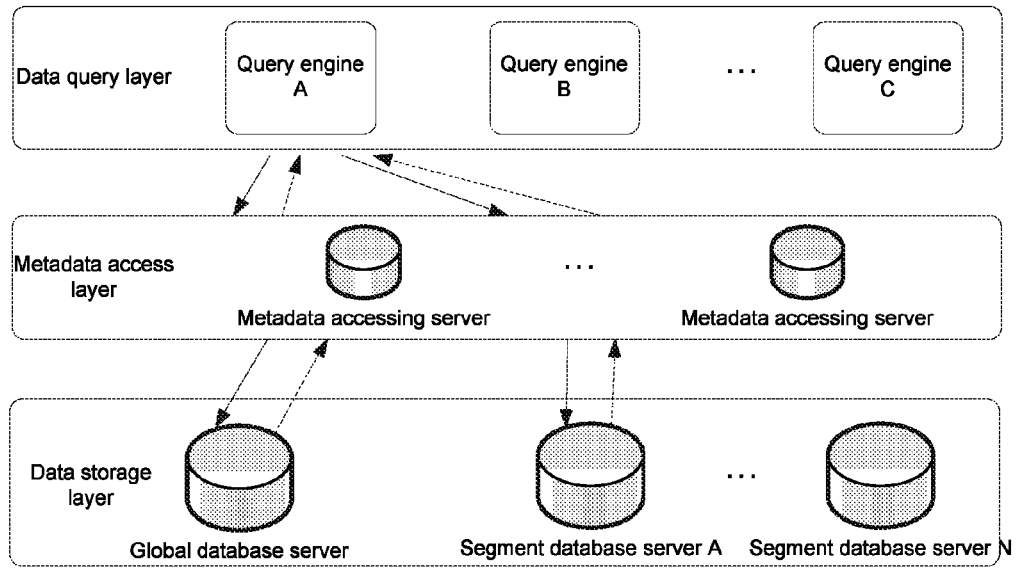
FIG. 1 is a schematic diagram illustrating an implementation environment for accessing metadata according to some embodiments of the present disclosure.

FIG. 1 shows an implementation environment of the method for accessing metadata according to some embodiments of the present disclosure. The implementation environment includes a data query layer, a metadata access layer and a data storage layer. The data storage layer includes a global database server and at least one segment database server. The global database server is adapted to store the authentication information of respective metadata. The table information of respective metadata is stored in one or more segment database server. The data query layer includes at least one query engine. The metadata access layer includes at least one metadata accessing server. The metadata accessing server may provide access to the metadata for the query engine utilizing the method for accessing metadata provided by the embodiments of the present disclosure.

Embodiment 1

Figure 2:
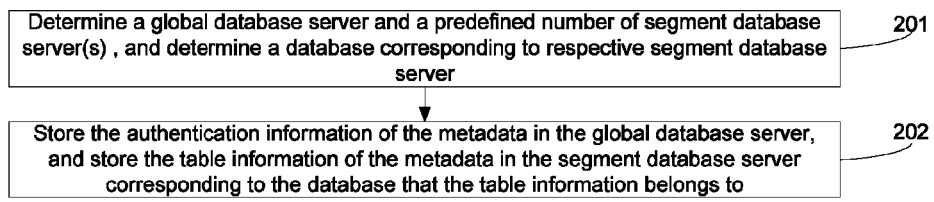
FIG. 2 is a flowchart illustrating a method for storing metadata in a distributed manner according to embodiment 1 of the present disclosure.

With reference to the implementation environment as shown in FIG. 1, this embodiment of the present disclosure provides a method for storing metadata in a distributed manner. As shown in FIG. 2, the method provided by this embodiment of the present disclosure includes the following.

In block 201, a global database server and a predefined number of segment database server(s) are determined, and a database corresponding to respective segment database server is determined.

In this embodiment, the method for determining the global database server and the predefined number of segment database server(s) is not restricted. It may include but is not limited to: selecting one of at least two existing servers as the global database server, and taking the remaining servers as the segment database server(s).

In addition, this embodiment also does not restrict the method for determining the database corresponding to respective segment database server. It may include but is not limited to the following three steps.

In step 1: the number of the segment database servers is determined.

In this embodiment, the method for determining the number of the segment database servers is not restricted. For example, the method for determining the segment database servers includes: selecting one of at least two existing servers as the global database server, and taking the remaining servers as the segment database servers. As such, the number of the segment database servers equals to the number of existing servers minus 1.

In step 2: an integer interval of a predefined length is divided into the same number of regions as the segment database servers.

The divided regions may have the same or different sizes. This embodiment does not restrict the size of the divided regions. In addition, this embodiment also does not restrict the dividing method. It may include but is not limited to: equally dividing the predefined integer interval according to the number of the segment database servers.

In step 3: for each region, a correspondence is created between the region and one segment database server, and a mapping table between the regions and the segment database servers are created according to the correspondence between each region and the corresponding segment database server.

This embodiment does not restrict the method for creating the correspondence between the region and the segment database server. For example, each region may correspond to one segment database server according to a supporting ability of respective segment database server, and an obtained mapping table may be as shown in Table 1.

TABLE 1

| Region | Segment database server |
| --- | --- |
| (0, 2] | Segment database server A |
| (2, 4] | Segment database server B |
| (4, 6] | Segment database server C |
| . . . | . . . |

Figure 3:
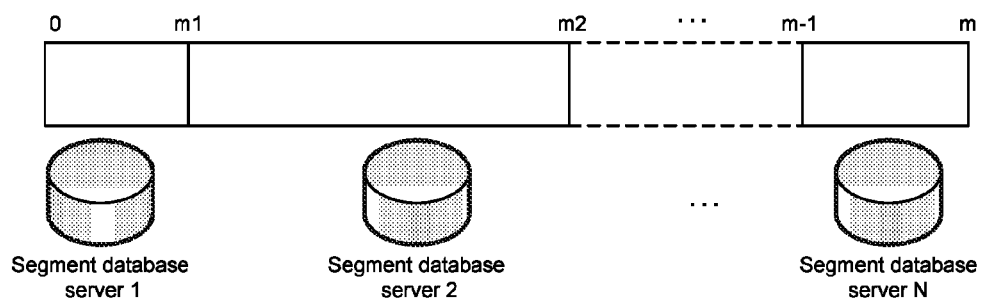
FIG. 3 is a schematic diagram illustrating a correspondence between regions and segment database servers for distributed storage of the metadata according to embodiment 1 of the present disclosure.

After block 201, each region is corresponding to one segment database server. As shown in FIG. 3, region (0, m1] corresponds to segment database server 1, region (m1, m2] corresponds to segment database server 2 . . . and region (m−1, m] corresponds to segment database server N. Certainly, the regions may be obtained via other dividing manners. This embodiment does not restrict the dividing manner of the regions. The correspondence between the regions and the segment database servers may be other corresponding relationships, which is not restricted in the present disclosure.

In block 202, the authentication information of the metadata is stored in the global database server, and the table information of the metadata is stored in the segment database server corresponding to the database that the table information belongs to.

In this embodiment, the method for storing the table information corresponding to the metadata into the segment database server corresponding to the database that the table information belongs to is not restricted. It may include but is not limited to the following two sub-blocks.

In sub-block 202-1, the segment database server corresponding to the database that the table information of the metadata belongs to is determined.

In this embodiment, the method for determining the segment database server corresponding to the database that the table information of the metadata belongs to is not restricted. It may include but is not limited to: performing a hash calculation to the name of the database that the table information of the metadata belongs to and obtaining a hash value, determining a region that the calculated hash value belongs to, searching the predefined mapping table between the regions and the segment database servers for a segment database server corresponding to the database that the table information of the metadata belongs to, and taking the found segment database server as the segment database server corresponding to the database that the table information of the metadata belongs to.

Take the mapping table as shown in Table 1 as an example. The determining of the segment database server corresponding to the database that the table information of the metadata of a database B belongs to includes: performing a hash calculation to the name of the database that the table information of the metadata of database B belongs to, and obtaining a hash value 5; determining that the region that the calculated hash value 5 belongs to is (4, 6]; finding in the mapping table as shown in Table 1 that the corresponding segment database server is segment database server C, and taking the segment database server C as the segment database server corresponding to the database that the table information of the metadata of database B belongs to. Certainly, the hash value corresponding to the name of the database that the table information of the metadata belongs to may be other values. It is not restricted in the present disclosure.

In sub-block 202-2, the table information of the metadata is stored in the segment database server corresponding to the database that the table information belongs to.

Still referring to the example provided in the sub-block 202-1, the table information of database B is stored into the segment database server C determined in sub-block 202-1.

Figure 4:
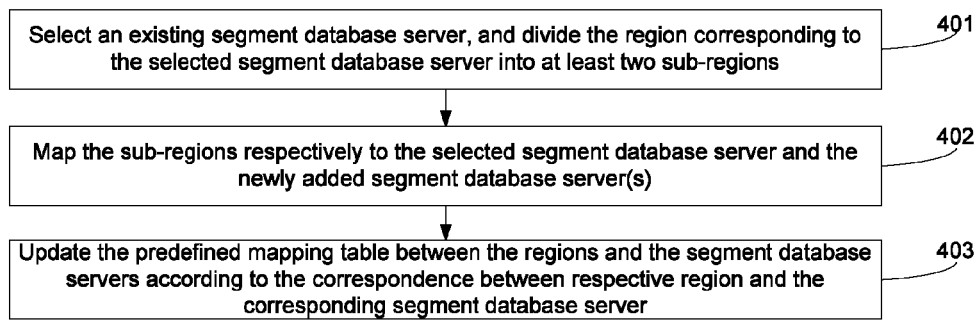
FIG. 4 is a flowchart illustrating a method for adding segment database server(s) according to embodiment 1 of the present disclosure.
Figure 5:
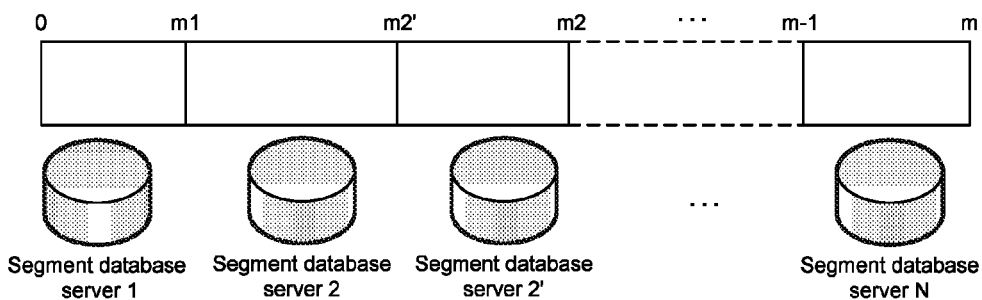
FIG. 5 is a schematic diagram illustrating a correspondence between regions and segment database servers after the addition of the segment database server(s) according to embodiment 1 of the present disclosure.

It should be noted that, after storing the metadata in a distributed manner via blocks 201 and 202, with the increase of the amount of the metadata in respective database, the storage space of a particular segment database server may be insufficient for the table information stored in the segment database server. Therefore, after storing the metadata in the distributed manner, the method provided by some embodiments of the present disclosure may further include a procedure of adding new segment database server(s) according to a practical situation, so as to increase the number of the segment database servers, and increase the expendability of the distributed storage method for the metadata. In an implementation, the method for adding the new segment database server(s) is not restricted, which may include but is not limited to adding the segment database server(s) via the following, as shown in FIG. 4.

In block 401, an existing segment database server is selected, and the region corresponding to the selected segment database server is divided into at least two sub-regions.

The method for selecting the existing segment database server is not restricted in the present disclosure. For example, the server with the highest load among the existing segment database servers may be selected. The dividing of the region corresponding to the selected segment database server into the at least two sub-regions is also not restricted in the present disclosure. For example, the number of the sub-regions divided from the region corresponding to the selected segment database server may be determined according to the number of newly added segment database server(s).

In block 402, for each sub-region, a correspondence is created between the sub-region and one of the selected segment database server and the newly added segment database server(s).

In this block, the method for creating the correspondence between the sub-regions and the selected segment database server and the newly-added segment database server(s) is not restricted. For example, the corresponding sub-regions may be selected respectively for the selected segment database server and the newly added segment database server(s) according to their supporting abilities.

In block 403, the predefined mapping table between the regions and the segment database servers is updated according to the correspondence between each region and the segment database server.

Suppose that the selected existing segment database server is the segment database server C, one segment database server E is newly added, the region corresponding to the segment database server C (12, 15] is divided into two sub-regions (12, 14] and (14, 15], the segment database server C corresponds to the sub-region (12, 14], and the segment database server E corresponds to the sub-region (14, 15]. The correspondence between the segment database server C and the region (12, 15] in the mapping table is updated to: the segment database server C corresponds to the sub-region (12, 14], and the segment database server E corresponds to the sub-region (14, 15].

Figure 15:
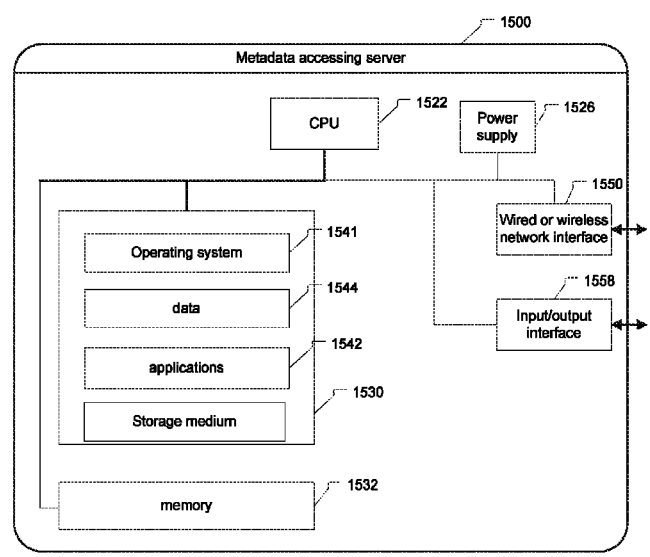
FIG. 15 is a schematic diagram illustrating a structure of a metadata accessing server according to embodiment 5 of the present disclosure.

In particular, as shown in FIG. 15, after blocks 401 to 403, the region (m1, m2] corresponding to the selected existing segment database server 2 may be divided into two sub-regions (m1, m1'] and (m1', m2], the sub-region (m1, m1'] corresponds to the existing segment database server 2, and the sub-region (m1', m2] corresponds to the newly added segment database server 2'. Thus, the adding of the new segment database server into the existing distributed storage structure for the metadata is realized.

In the method provided by this embodiment, through storing the authentication information of the metadata into the global database server and storing the table information of the metadata into one or more segment database servers, distributed storage of the metadata is realized. Through adding new segment database server(s), expansion of the storage of the metadata is realized and the expandability of the distributed data warehouse is increased.

Embodiment 2

Figure 6:
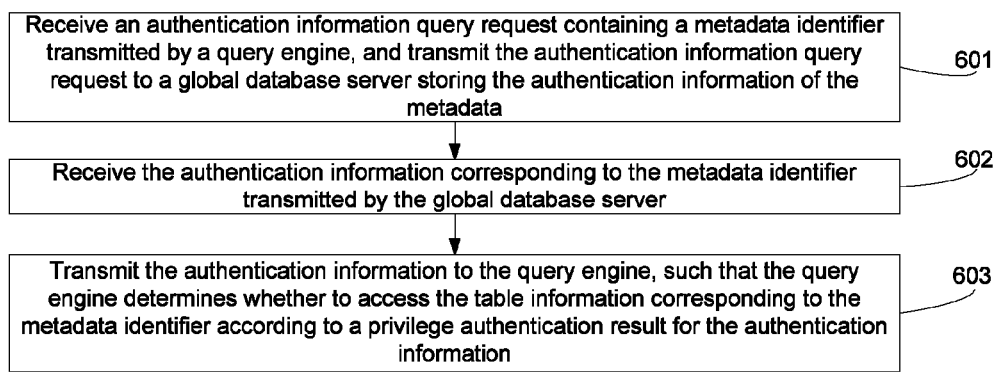
FIG. 6 is a flowchart illustrating a method for accessing metadata according to embodiment 2 of the present disclosure.

With reference to the implementation environment as shown in FIG. 1 and the distributed storage manner for the metadata provided by embodiment 1, this embodiment provides a method for accessing metadata. As shown in FIG. 6, the method provided by this embodiment includes the following.

In block 601, an authentication information query request containing a metadata identifier transmitted by a query engine is received, and the authentication information query request is transmitted to a global database server storing the authentication information of the metadata.

In block 602, the authentication information corresponding to the metadata identifier transmitted by the global database server is received.

In block 603, the authentication information is transmitted to the query engine, such that the query engine determines whether to access the table information corresponding to the metadata identifier according to a privilege authentication result for the authentication information;

wherein the table information of the metadata is stored in one or more segment database servers, the one or more segment database servers and the global database server are different servers.

In the method provided by this embodiment, through storing the authentication information of the metadata in the global database server and storing the table information of the metadata in the one or more segment database servers, distributed storage of the metadata is realized. Meanwhile, the table information is stored in one or more segment database servers, which reduces the time for accessing the metadata, and therefore increases the speed for sharing and exchanging the information in the distributed data warehouse.

In order to make the metadata accessing method provided by the embodiments of the present disclosure clearer, a following embodiment 3 is provided with reference to the above embodiments to describe the metadata accessing method in further detail. The details are shown in embodiment 3.

Embodiment 3

Figure 7:
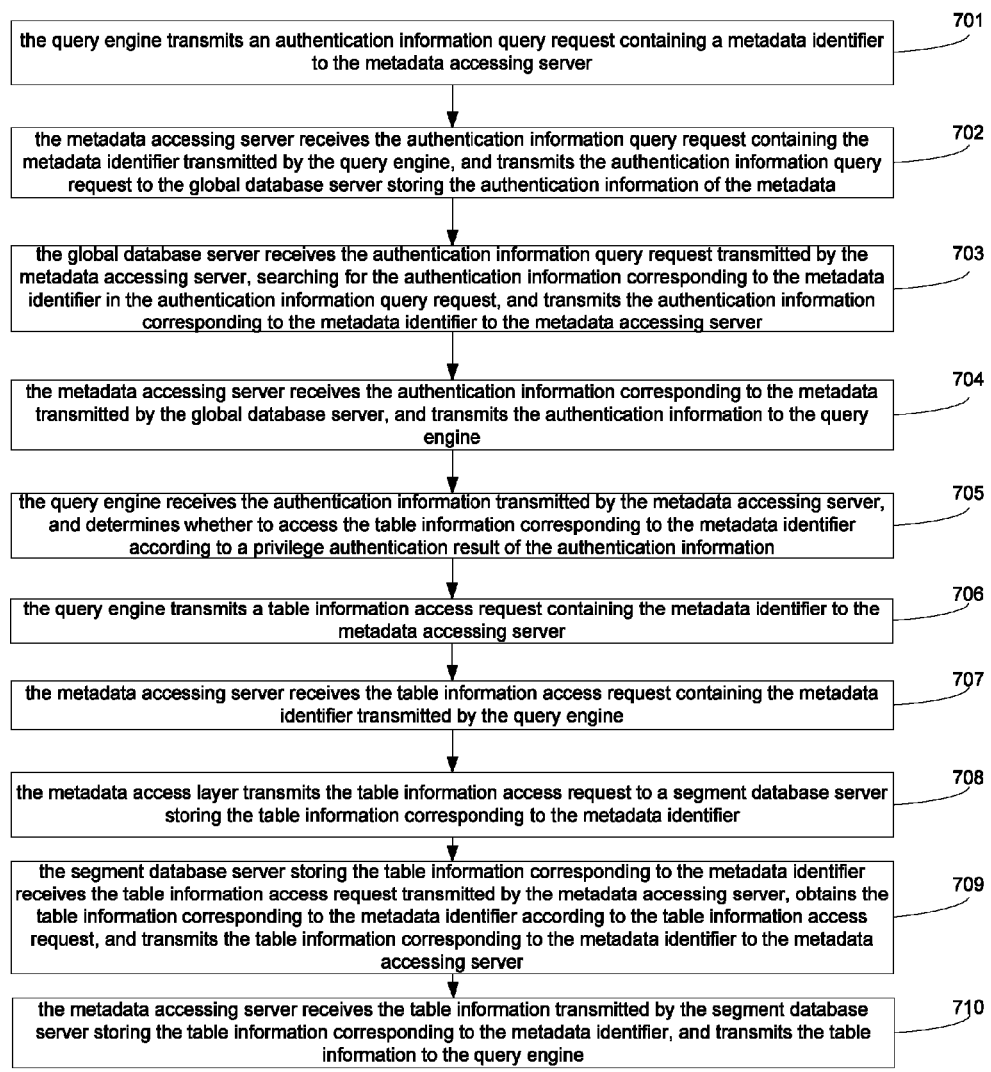
FIG. 7 is a flowchart illustrating a method for accessing metadata according to embodiment 3 of the present disclosure.

This embodiment provides a method for accessing metadata. For facilitating the description, suppose that this embodiment is applied in the implementation environment as shown in FIG. 1, and the query engine A of the data query layer obtains the table information of the metadata of table A in database A via the metadata accessing server of the metadata access layer. As shown in FIG. 7, the method provided by this embodiment includes the following.

In block 701, the query engine transmits an authentication information query request containing a metadata identifier to the metadata accessing server.

The method for obtaining the metadata identifier by the query engine is not restricted in this embodiment. It may include but is not limited to obtaining the identifier of metadata to be queried via a query interface.

In block 702, the metadata accessing server receives the authentication information query request containing the metadata identifier transmitted by the query engine, and transmits the authentication information query request to the global database server storing the authentication information of the metadata.

Before the method for accessing metadata provided by the embodiment is executed, since the metadata has been stored in a distributed manner, i.e., the authentication information of the metadata has been stored in the global database server in advance and the table information of the metadata has been stored in the one or more segment database servers, the metadata accessing server in the metadata access layer transmits the authentication information query request to the global database server after receiving the authentication information query request transmitted by the query engine, such that the global database server obtains the authentication information corresponding the metadata identifier contained in the authentication information query request. In this embodiment, the method for storing respective metadata in the distributed manner is not restricted, which may include but is not limited to the distributed storing manner described with reference to embodiment 1.

The example provided in block 701 is taken as an example, the metadata accessing server in the metadata access layer receives the authentication information query request containing the metadata identifier transmitted by the query engine A, and transmits the authentication information query request to the global database server.

In block 703, the global database server receives the authentication information query request transmitted by the metadata accessing server, searching for the authentication information corresponding to the metadata identifier in the authentication information query request, and transmits the authentication information corresponding to the metadata identifier to the metadata accessing server.

Since the authentication information of the metadata has been stored in the global database server in advance, the global database server can obtain the metadata identifier contained in the authentication information query request and finds the authentication information corresponding to the metadata identifier. This embodiment does not restrict the method for obtaining the metadata identifier. It may include but is not limited to analyzing the authentication information query request and obtaining the metadata identifier contained in the authentication information query request.

If the authentication information of the metadata is stored in the global database server in advance in a form of <metadata identifier, authentication information> pair, after the global database server receives the authentication information query request transmitted by the metadata accessing server in block 702, the global database server analyzes the authentication information query request, and obtains the metadata identifier contained in the authentication information query request, if the metadata identifier is table A, the global database server finds <table A, authentication information A> pair in the <metadata identifier, authentication information> pair stored in advance, takes the authentication information A in the <table A, authentication information A> pair as the found authentication information and transmits the authentication information A to the metadata accessing server.

Certainly, the authentication information of the metadata may also be stored in the global database server in advance in form of a two dimensional table or other forms. This embodiment does not restrict the detailed form of the authentication information of the metadata stored in the global database server.

In block 704, the metadata accessing server receives the authentication information corresponding to the metadata transmitted by the global database server, and transmits the authentication information to the query engine.

Still taken the example provided in block 703 as an example. After receiving the authentication information A transmitted by the global database server in block 703, the metadata accessing server transmits the authentication information A to the query engine A.

In block 705, the query engine receives the authentication information transmitted by the metadata accessing server, and determines whether to access the table information corresponding to the metadata identifier according to a privilege authentication result of the authentication information.

The privilege authentication result includes but is not limited to privilege authentication succeeds and privilege authentication failed. If the privilege authentication succeeds, the query engine can proceed with the access to the table information of the metadata. If the privilege authentication failed, the query engine gives up the access to the table information of the metadata due to having no access privilege. In this embodiment, the manner for performing the determination of whether to access the table information corresponding to the metadata identifier according to the privilege authentication result of the authentication information is not restricted. It may include but is not limited to: if the query engine obtains the metadata identifier as well as an instruction for performing an operation to the metadata corresponding to the metadata identifier, the query engine is able to verify whether it has the access privilege for performing the operation to the metadata according to the authentication information transmitted by the metadata accessing server. If the verification succeeds, i.e. the privilege authentication result is privilege authentication succeeds, it indicates that the query engine has the corresponding access privilege, the method proceeds with blocks 706 to 710 to access the table information corresponding to metadata identifier. If the verification failed, i.e., the privilege authentication result is privilege authentication failed, it indicates that the query engine has no corresponding access privilege. Therefore, the procedure ends. In order to describe the method for accessing metadata provided by the embodiments of the present disclosure more compressively, the method provided by this embodiment is described supposing that the privilege authentication result is privilege authentication succeeds. The details are shown in the following.

For example, the query engine A receives the authentication information A transmitted by the metadata accessing server in block 704, determines whether it has access privilege for operating the metadata of table A according to the authentication information A. If the privilege authentication result is privilege authentication succeeds, the method proceeds with the flow of accessing the table information of the metadata of table A; otherwise, the access procedure to the metadata of table A ends.

In block 706, the query engine transmits a table information access request containing the metadata identifier to the metadata accessing server.

After determining according to the privilege authentication result of the authentication information that the query engine has the access privilege for accessing the table information of the metadata, the query engine transmits a table information access request containing the metadata identifier to the metadata accessing server.

For example, the query engine A transmits a table information access request containing table A to the metadata accessing server.

In block 707, the metadata accessing server receives the table information access request containing the metadata identifier transmitted by the query engine.

Still suppose that the query engine accesses the metadata of table A and the metadata identifier of the metadata is table A. The metadata accessing server receives the table information access request containing the table A transmitted by the query engine in block 706.

In block 708, the metadata access layer transmits the table information access request to a segment database server storing the table information corresponding to the metadata identifier.

Since the table information of the metadata is stored in one or more segment database servers and the table information of the metadata of one table is stored in one segment database server, in order to reduce the time for accessing the metadata and increase access efficiency, after the metadata accessing server receives the table information access request, the metadata accessing server searches for the segment database server storing the table information corresponding to the metadata identifier, and transmits the table information access request to the found segment database server.

In this embodiment, the manner that the metadata accessing server transmits the table information access request to the segment database server storing the table information corresponding to the metadata identifier is not restricted, which may include but is not limited to the following four blocks.

In block 708-1, the name of the database corresponding to the metadata identifier is determined.

For block 708-1, the manner for determining the name of the database corresponding to the metadata identifier is not restricted, which may include but is not limited to: if the metadata accessing server stores a correspondence table between the metadata and the database in advance, the metadata accessing server finds the name of the database corresponding to the metadata identifier in the correspondence table between the metadata and the database stored in advance.

For example, suppose that the metadata identifier is table A. Thus, the metadata accessing server finds in the correspondence table between the metadata and the database stored in advance that the name of the database corresponding to the table A is database A.

Certainly, the name of the database corresponding to the metadata identifier may be database A or others, which is not restricted in the present disclosure.

In block 708-2, a hash value is calculated according to the name of the database corresponding to the metadata identifier.

For block 708-2, the manner for calculating the hash value of the name of the database corresponding to the metadata identifier is not restricted.

For example, suppose that the name of the database determined in block 708-1 is database A and the hash value obtained by performing the hash calculation to the name of database A is 2. Certainly, the hash value obtained by the hash calculation to the name of the database corresponding to the metadata identifier may be other values, which is not restricted in the present disclosure.

In block 708-3, a region that the calculated hash value belongs to is determined, and a segment database server corresponding to the region that the hash value belongs to is found according to a predefined mapping table between regions and the segment database servers.

Since the predefined mapping table between the regions and the segment database servers stores the mapping relationship between the regions and the segment database servers, it is possible to find the segment database server corresponding to the region that the calculated hash value belongs to according to the predefined mapping table between the regions and the segment database servers.

For example, suppose that the region that the hash value 2 calculated in block 708-2 belongs to is (1, 2]. It is possible to find according to the predefined mapping table between the regions and the segment database servers that the segment database server corresponding to the region that the hash value belongs to is the segment database server A. Certainly, the segment database server corresponding to the region that the hash value belongs to may also be server 1 or other servers, which is not restricted in the present disclosure.

It should be noted that, in this embodiment, the manner for configuring the predefined mapping table between the regions and the segment database servers is not restricted, which may include but is not limited to the method provided by steps 1 to 3 in block 201 of embodiment 1.

In block 708-4, the found segment database server is taken as the segment database server storing the table information corresponding to the metadata identifier, and the table information access request is transmitted to the found segment database server.

The metadata accessing server takes the segment database server A found in block 708-3 as the segment database server storing the table information corresponding to the metadata identifier, and transmits the table information access request received in block 707 to the segment database server A.

In block 709, the segment database server storing the table information corresponding to the metadata identifier receives the table information access request transmitted by the metadata accessing server, obtains the table information corresponding to the metadata identifier according to the table information access request, and transmits the table information corresponding to the metadata identifier to the metadata accessing server.

For this block, since the table information of the metadata has been stored in the corresponding segment database server in advance, the segment database server storing the table information corresponding to the metadata identifier receives the table information access request and determines the table information corresponding to the metadata identifier according to the metadata identifier contained in the table information access request. In this embodiment, the manner for obtaining the table information according to the table information access request is not restricted.

For example, the metadata identifier is table A. If the table information of the metadata is stored in the corresponding segment database server in advance in form of <metadata identifier, table information> pair, after receiving the table information access request containing the table A transmitted by the metadata accessing server in block 708, the segment database server A analyzes the table information access request, obtains the table A contained in the table information access request, and finds <table A, table information A> pair in the pre-stored <metadata identifier, table information> pair, takes the table information A in the <table A, table information A> pair as the table information corresponding to the table A, and transmits the table information A to the metadata accessing server.

Certainly, the table information of the metadata may also be stored in the segment database server in advance in form of a two dimensional table or other forms, which is not restricted in the present disclosure. In addition, the table information corresponding to the table A in the <metadata identifier, table information> pair may also be table information B or other information, which is also not restricted in the present disclosure.

In block 710, the metadata accessing server receives the table information transmitted by the segment database server storing the table information corresponding to the metadata identifier, and transmits the table information to the query engine.

For example, the metadata accessing server receives the table information A transmitted by the segment database server A, and transmits the table information A to the query engine A.

It should be noted that, in this and subsequent embodiments, the manner for transmitting the authentication information query request, the authentication information, the table information access request or the table information between the data query layer and the metadata access layer and between the metadata access layer and the data storage layer is not restricted, which may include but is not limited to: encapsulating the authentication information query request, the authentication information, the table information access request or the table information in a message, and transmitting the authentication information query request, the authentication information, the table information access request or the table information via the message. In addition, in this and subsequent embodiments, the manner for receiving the authentication information query request, the authentication information, the table information access request or the table information between the data query layer and the metadata access layer and between the metadata access layer and the data storage layer is also not restricted, which may include but is not limited to: receiving a message and analyzing the message to obtain the authentication information query request, the authentication information, the table information access request or the table information.

Figure 8:
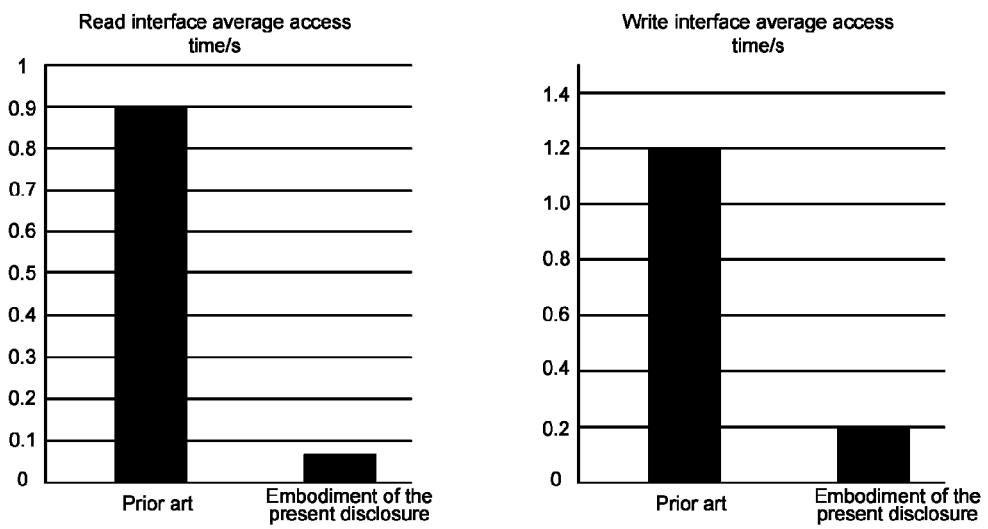
FIG. 8 shows a comparison of average access times respectively for a read interface and a write interface between the method for accessing metadata provided by embodiment 3 and the prior art.

In addition, since the authentication information of the metadata has been stored in the global database server and the table information of the metadata has been stored in one or more segment database servers, when accessing the metadata according to the method provided by the present disclosure, merely the global database server and the segment database server storing the table information corresponding to the metadata identifier are accessed, which reduces the read interface average access time and write interface average access time. In order to make the advantage brought out by the present disclosure clearer, FIG. 8 shows a comparison of the method provided by the embodiments of the present disclosure and the conventional techniques with respect to the read interface average access time and write interface average access time. The details are shown in FIG. 8.

In the method provided by the embodiments of the present disclosure, through storing the authentication information of the metadata in the global database server and storing the table information of the metadata in one or more segment database servers, distributed storage of the metadata is realized. In addition, the number of segment database servers may be adjusted according to a practical requirement, which realizes the expansion of the storage for the metadata, and therefore increases the expandability of the distributed data warehouse. Through storing the table information in one or more segment database servers, the time for accessing the metadata is reduced and then the speed for sharing and exchanging information in the distributed data warehouse is increased.

Embodiment 4

Figure 9:
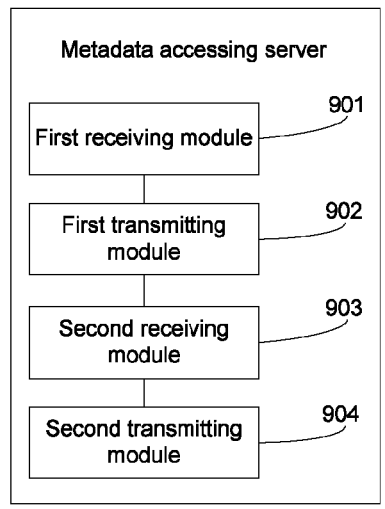
FIG. 9 is a schematic diagram illustrating a first structure of a metadata accessing server according to embodiment 4 of the present disclosure.

Some embodiments of the present disclosure provide a metadata accessing server, adapted to execute the method for accessing metadata provided by the above embodiments 1 to 3. As shown in FIG. 9, the metadata accessing server includes:

a first receiving module 901, adapted to receive an authentication information query request containing a metadata identifier transmitted by a query engine;

a first transmitting module 902, adapted to transmit the authentication information query request received by the first receiving module 901 to a global database server storing authentication information of metadata;

a second receiving module 903, adapted to receive authentication information corresponding to the metadata identifier transmitted by the global database server;

a second transmitting module 904, adapted to transmit the authentication information received by the second receiving module 903 to the query engine, such that the query engine determines whether to access table information corresponding to the metadata identifier according to a privilege authentication result of the authentication information;

wherein the table information of the metadata is stored in one or more segment database servers, the one or more segment database servers and the global database server are different servers.

Figure 10:
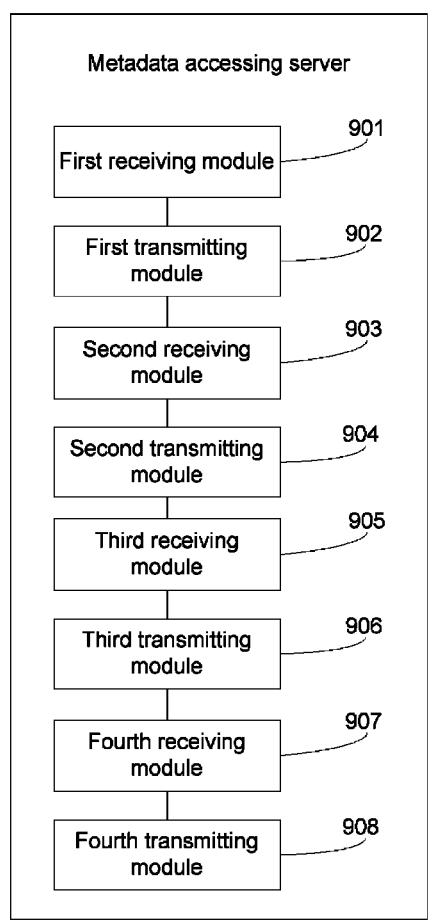
FIG. 10 is a schematic diagram illustrating a second structure of the metadata accessing server according to embodiment 4 of the present disclosure.

As shown in FIG. 10, the metadata accessing server may further include:

a third receiving module 905, adapted to receive a table information access request containing the metadata identifier transmitted by the query engine;

a third transmitting module 906, adapted to transmit the table information access request received by the third receiving module 905 to a segment database server storing the table information corresponding to the metadata identifier;

a fourth receiving module 907, adapted to receive the table information transmitted by the segment database server storing the table information corresponding to the metadata identifier; and a fourth transmitting module 908, adapted to transmit the table information received by the fourth receiving module 907 to the query engine.

Figure 11:
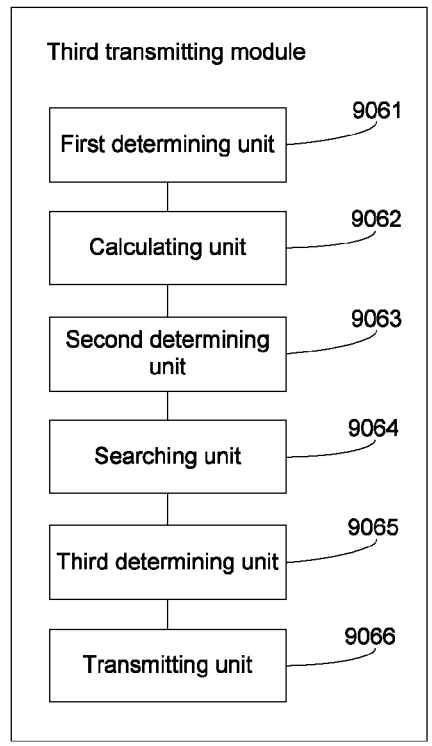
FIG. 11 is a schematic diagram illustrating a structure of a third transmitting module according to embodiment 4 of the present disclosure.

As shown in FIG. 11, the third transmitting module 906 may include:

a first determining unit 9061, adapted to determine the name of a database corresponding to the metadata identifier;

a calculating unit 9062, adapted to calculate a hash value of the name of the database corresponding to the metadata identifier determined by the first determining unit 9061;

a second determining unit 9063, adapted to determine a region that the calculated hash value belongs to;

a searching unit 9064, adapted to search a predefined mapping table between regions and segment database servers for a segment database server corresponding to the region that the hash value calculated by the calculating unit 9062 belongs to;

a third determining unit 9065, adapted to take the segment database server found by the searching unit 9064 as the segment database server storing the table information corresponding to the metadata identifier; and a transmitting unit 9066, adapted to transmit the table information access request to the segment database server determined by the third determining unit 9065.

Figure 12:
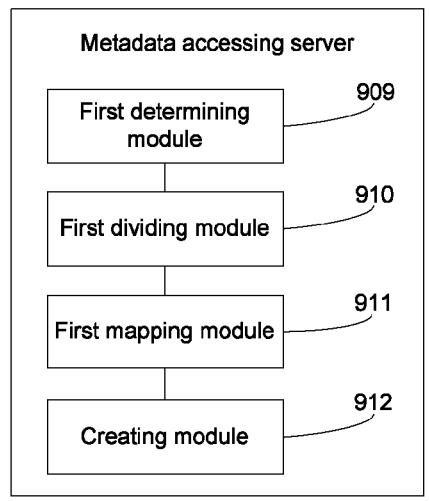
FIG. 12 is a schematic diagram illustrating a third structure of the metadata accessing server according to embodiment 4 of the present disclosure.

As shown in FIG. 12, the metadata accessing server may further include:

a first determining module 909, adapted to determine the number of the segment database servers;

a first dividing module 910, adapted to divide an integer interval of a predefined length into the same number of regions as the segment database servers;

a first mapping module 911, adapted to map each region to one segment database server; and a creating module 912, adapted to create a mapping table between the regions and the segment database servers according to the correspondence between each region and the corresponding segment database server.

Figure 13:
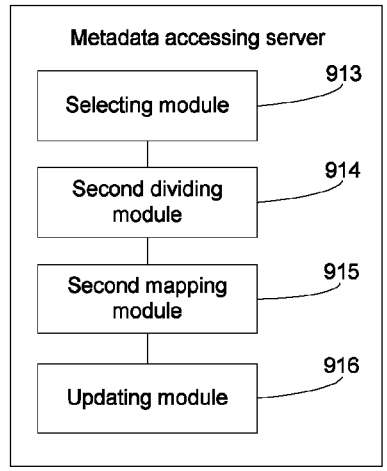
FIG. 13 is a schematic diagram illustrating a fourth structure of the metadata accessing server according to embodiment 4 of the present disclosure.

As shown in FIG. 13, the metadata accessing server may further include:

a selecting module 913, adapted to select an existing segment database server;

a second dividing module 914, adapted to divide the region corresponding to the segment database server selected by the selecting module 913 into at least two sub-regions;

a second mapping module 915, adapted to map the sub-regions respectively to the selected segment database server and one or more newly added segment database servers; and an updating module 916, adapted to update the predefined mapping table between the regions and the segment database servers according to the correspondence between each region and the corresponding segment database server.

Figure 14:
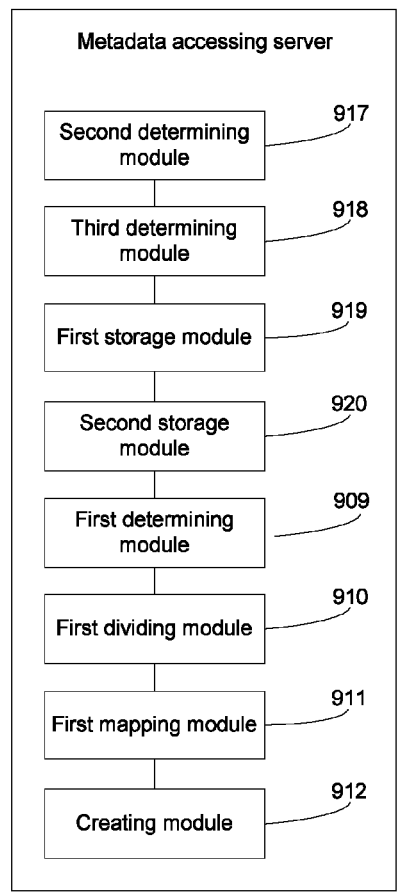
FIG. 14 is a schematic diagram illustrating a fifth structure of the metadata accessing server according to embodiment 4 of the present disclosure.

As shown in FIG. 14, the metadata accessing server may further include:

a second determining module 917, adapted to determine the global database server and a predefined number of segment database servers;

a third determining module 918, adapted to determine a database corresponding to each segment database server;

a first storage module 919, adapted to store the authentication information of the metadata in the global database server; and a second storage module 920, adapted to store the table information of the metadata in the segment database server corresponding to the database that the table information belongs to.

According to the metadata accessing server provided by the embodiments of the present disclosure, through obtaining the authentication information required by the query engine from the global database server storing the authentication information of the metadata and obtaining the table information required by the query engine from the segment database server storing the table information of the metadata, the access to the metadata is realized in the distributed storage manner of the metadata, which reduces the time for accessing the metadata and therefore increases the speed for sharing and exchanging information in the distributed data warehouse.

Embodiment 5

This embodiment provides a metadata accessing server, applicable for implementing the method for accessing metadata provided by the above embodiments. As shown in FIG. 15, the metadata accessing server 1500 may be variable due to different configurations or performances. It may include one or more central processing units (CPUs) 1522 (e.g. one or more processors) and a memory 1532, one or more storage medium 1530 (e.g. one or more mass storage devices) for storing applications 1542 or data 1544, wherein the memory 1532 and the storage medium 1530 may temporarily or permanently store data.

Further, the CPU 1522 may be adapted to communicate with the storage medium 1530 and execute a series of instruction operations in the storage medium 1530 on the metadata accessing server 1500.

The metadata accessing server 1500 may further include one or more power supplies 1526, one or more wired or wireless network interface 1550, one or more input/output interfaces 1558, and/or one or more operating systems 1541, such as Windows Server™, Mac OS X™, Unix™, Linux™, FreeBSD™, etc.

The program stored in the storage medium 1530 may include one or more modules (not shown in FIG. 15). Each mode may include a series of instruction operations for the server 1500:

receiving an authentication information query request containing a metadata identifier transmitted by a query engine, transmitting the authentication information query request to a global database server storing authentication information of the metadata;

receiving the authentication information corresponding to the metadata identifier transmitted by the global database server;

transmitting the authentication information to the query engine, such that the query engine determine whether to access the table information corresponding to the metadata identifier according to a privilege authentication result of the authentication information;

wherein the table information of the metadata is stored in one or more segment database servers, the one or more segment database servers and the global database server are different servers.

Suppose that the above is a first implementation manner, in a second implementation manner provided based on the first implementation manner, instructions for performing the following operations may be included:

receiving a table information access request containing the metadata identifier transmitted by the query engine;

transmitting the table information access request to a segment database server storing the table information corresponding to the metadata identifier; and receiving the table information transmitted by the segment database server storing the table information corresponding to the metadata identifier; and transmitting the table information to the query engine.

In a third implementation manner provided based on the second implementation manner, instructions for executing the following operations may be included:

determining the name of a database corresponding to the metadata identifier;

calculating a hash value of the name of the database corresponding to the metadata identifier;

determining a region that the calculated hash value belongs to, and finding a segment database server corresponding to the region that the calculated hash value belongs to according to a predefined mapping table between regions and segment database servers; and taking the found segment database server as the segment database server storing the table information corresponding to the metadata identifier, and transmitting the table information access request to the found segment database server.

In a fourth implementation manner provided based on third implementation manner, instructions for executing the following operations may be included:

determining the number of the segment database servers;

dividing an integer interval of a predefined length into the same number of regions as the segment database servers; and mapping each region to one segment database server, and creating a mapping table between regions and segment database servers according to the correspondence between each region and the corresponding segment database server.

In a fifth implementation manner provided based on the fourth implementation manner, instructions for executing the following operations may be included:

selecting an existing segment database server, and dividing the region corresponding to the selected segment database server into at least two sub-regions;

mapping sub-regions respectively to the selected segment database server and at least one newly added segment database server; and updating the mapping table between the regions and the segment database servers according to the correspondence between each region and the segment database server.

In a sixth embodiment based on any one of the first to the fifth implementation manners, instructions for executing the following operations may be included:

determining the global database server and a predefined number of segment database servers, and determining a database corresponding to each segment database server; and storing the authentication information of the metadata into the global database server, and storing table information of the metadata into the segment database server corresponding to the database that the table information belongs to.

In view of the above, according to the metadata accessing server provided by the present disclosure, through obtaining the authentication information required by the query engine from the global database server storing the authentication information of the metadata and obtaining the table information required by the query engine from the segment database server storing the table information, the access to the metadata in the distributed storage manner of the metadata is realized, which reduces the time for accessing the metadata and therefore increases the speed for sharing and exchanging information in the distributed data warehouse.

Embodiment 6

Figure 16:
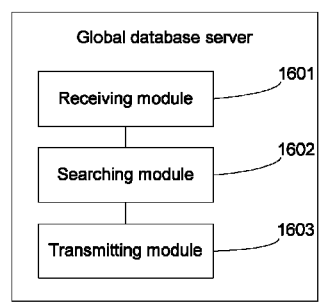
FIG. 16 is a schematic diagram illustrating a structure of a global database server according to embodiment 6 of the present disclosure.

This embodiment provides a global database server. As shown in FIG. 16, the global database server includes:

a receiving module 1601, adapted to receive an authentication information query request containing a metadata identifier transmitted by a metadata accessing server, wherein the authentication information query request is transmitted to the metadata accessing server by an query engine;

a searching module 1602, adapted to search stored authentication information for the authentication information corresponding to the metadata identifier;

a transmitting module 1603, adapted to transmit the authentication information corresponding to the metadata identifier to the metadata accessing server, wherein the metadata accessing server transmits the authentication information to the query engine, and the query engine determines whether to access table information corresponding to the metadata identifier according to a privilege authentication result of the authentication information;

wherein the table information of the metadata is stored in one or more segment database servers.

Figure 17:
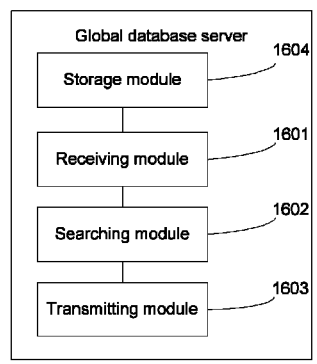
FIG. 17 is a schematic diagram illustrating another structure of the global database server according to embodiment 6 of the present disclosure.

As shown in FIG. 17, the global database server may further include:

a storage module 1604, adapted to store the authentication information of the metadata.

According to the global database server provided by the embodiment of the present disclosure, through storing the authentication information of the metadata, returning the authentication information after receiving the authentication information query request transmitted by the metadata accessing server, the access to the metadata in the distributed storage manner of the metadata is realizes, which reduces the time for accessing the metadata and increases the speed for sharing and exchanging the information in the data warehouse.

Embodiment 7

Figure 18:
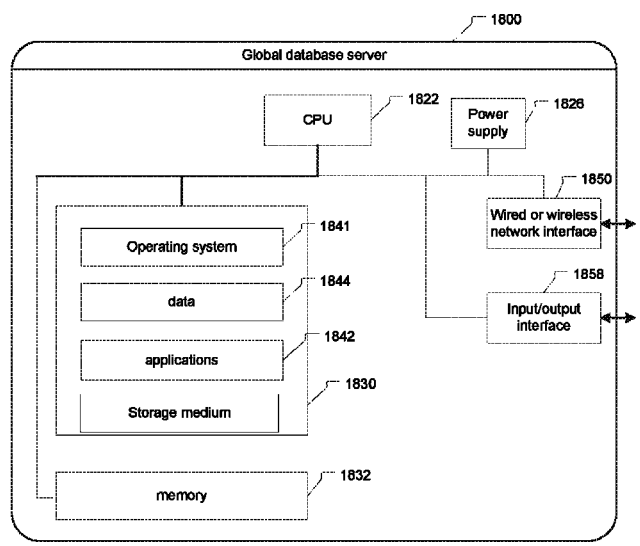
FIG. 18 is a schematic diagram illustrating a structure of the global database server according to embodiment 7 of the present disclosure.

This embodiment provides a global database server. As shown in FIG. 18, the global database server 1800 may be variable due to different configurations or performances. It may include one or more central processing units (CPUs) 1822 (e.g. one or more processors) and a memory 1832, one or more storage medium 1830 (e.g. one or more mass storage devices) for storing applications 1842 or data 1844, wherein the memory 1832 and the storage medium 1830 may temporarily or permanently store data.

Further, the CPU 1822 may be adapted to communicate with the storage medium 1830 and execute a series of instruction operations in the storage medium 1830 on the global database server 1800.

The global database server 1800 may further include one or more power supplies 1826, one or more wired or wireless network interface 1850, one or more input/output interfaces 1858, and/or one or more operating systems 1841, such as Windows Server™, Mac OS X™, Unix™, Linux™, FreeBSD™, etc.

The program stored in the storage medium 1830 may include one or more modules (not shown in FIG. 18). Each mode may include a series of instruction operations for the global database server 1800:

receiving an authentication information query request containing a metadata identifier transmitted by a metadata accessing server, wherein the authentication information query request is transmitted to the metadata accessing server by an query engine;

searching stored authentication information for the authentication information corresponding to the metadata identifier;

transmitting the authentication information corresponding to the metadata identifier to the metadata accessing server, wherein the metadata accessing server transmits the authentication information to the query engine, and the query engine determines whether to access table information corresponding to the metadata identifier according to a privilege authentication result of the authentication information;

wherein the table information of the metadata is stored in one or more segment database servers.

Suppose that the above is a first possible implementation manner, in a second possible implementation manner based on the first possible implementation manner, instructions for performing the following operations may be included:

storing the authentication information of the metadata.

According to the global database server provided by the embodiment of the present disclosure, through storing the authentication information of the metadata, returning the authentication information after receiving the authentication information query request transmitted by the metadata accessing server, the access to the metadata in the distributed storage manner of the metadata is realizes, which reduces the time for accessing the metadata and increases the speed for sharing and exchanging the information in the data warehouse.

Embodiment 8

Figure 19:
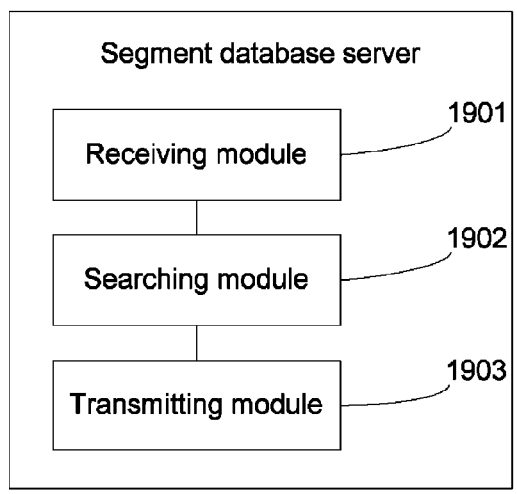
FIG. 19 is a schematic diagram illustrating a structure of a segment database server according to embodiment 8 of the present disclosure.

This embodiment provides a segment database server. As shown in FIG. 19, the segment database server includes:

a receiving module 1901, adapted to receive a table information access request containing a metadata identifier transmitted by a metadata accessing server, wherein the table information access request is transmitted to the metadata accessing server by a query engine;

a searching module 1902, adapted to search for table information corresponding to the metadata identifier; and a transmitting module 1903, adapted to transmit the table information to the metadata accessing server, wherein the metadata accessing server transmits the table information to the query engine.

Figure 20:
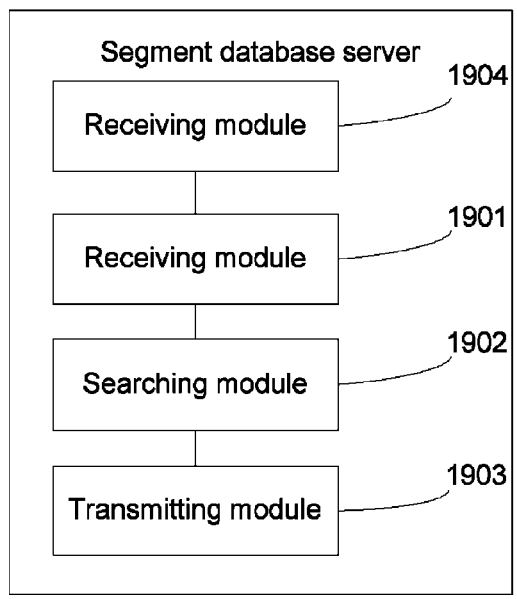
FIG. 20 is a schematic diagram illustrating another structure of the segment database server according to embodiment 8 of the present disclosure.

As shown in FIG. 20, the segment database server may further include:

a storage module 1904, adapted to store the table information corresponding to the metadata in a corresponding database.

According to the segment database server provided by the embodiment, through storing the table information of the metadata, and returning the table information to the metadata accessing server after receiving the table information query request transmitted by the metadata accessing server, the access to the metadata in the distributed storage manner of the metadata is realized, which reduces the time for accessing the metadata and increases the speed for sharing and exchanging information in the data warehouse.

Embodiment 9

Figure 21:
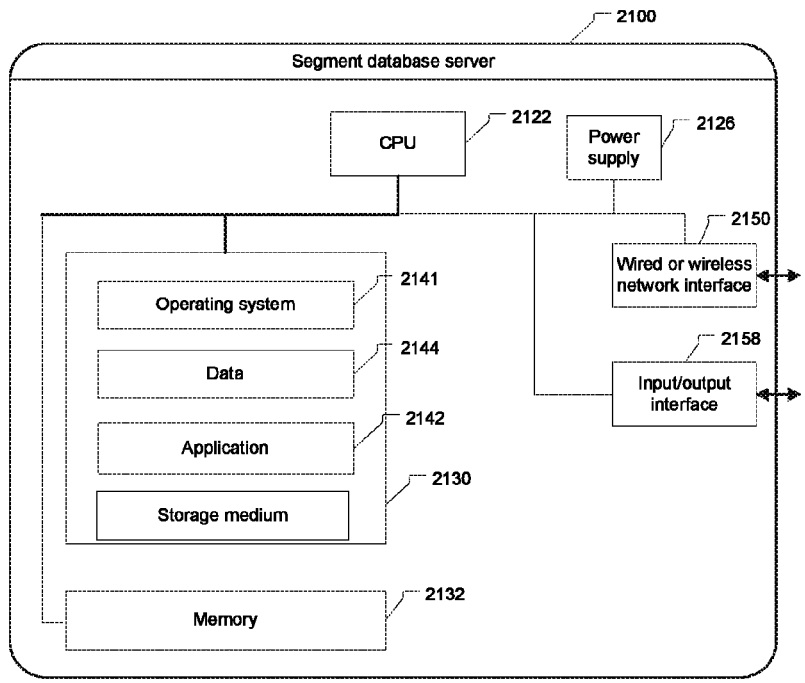
FIG. 21 is a schematic diagram illustrating a structure of the segment database server according to embodiment 9 of the present disclosure.

This embodiment provides a segment database server. As shown in FIG. 21, the segment database server 2100 may be variable due to different configurations or performances. It may include one or more central processing units (CPUs) 2122 (e.g. one or more processors) and a memory 2132, one or more storage medium 2130 (e.g. one or more mass storage devices) for storing applications 2142 or data 2144, wherein the memory 2132 and the storage medium 2130 may temporarily or permanently store data.

Further, the CPU 2122 may be adapted to communicate with the storage medium 2130 and execute a series of instruction operations in the storage medium 2130 on the segment database server 2100.

The global database server 2100 may further include one or more power supplies 2126, one or more wired or wireless network interface 2150, one or more input/output interfaces 2158, and/or one or more operating systems 2141, such as Windows Server™, Mac OS X™, Unix™, Linux™, FreeBSD™, etc.

The program stored in the storage medium 2130 may include one or more modules (not shown in FIG. 21). Each mode may include a series of instruction operations for the segment database server 2100:

receiving a table information access request containing a metadata identifier transmitted by a metadata accessing server, wherein the table information access request is transmitted to the metadata accessing server by a query engine;

searching for table information corresponding to the metadata identifier; and transmitting the table information to the metadata accessing server, wherein the metadata accessing server transmits the table information to the query engine.

Suppose that the above is a first possible implementation manner, in a second possible implementation manner based on the first possible implementation manner, instructions for performing the following operations may be included:

storing the table information of the metadata in a corresponding database.

According to the segment database server provided by the embodiment of the present disclosure, through storing the authentication information of the metadata, returning the authentication information after receiving the authentication information query request transmitted by the metadata accessing server, the access to the metadata in the distributed storage manner of the metadata is realizes, which reduces the time for accessing the metadata and increases the speed for sharing and exchanging the information in the data warehouse.

Embodiment 10

Figure 22:
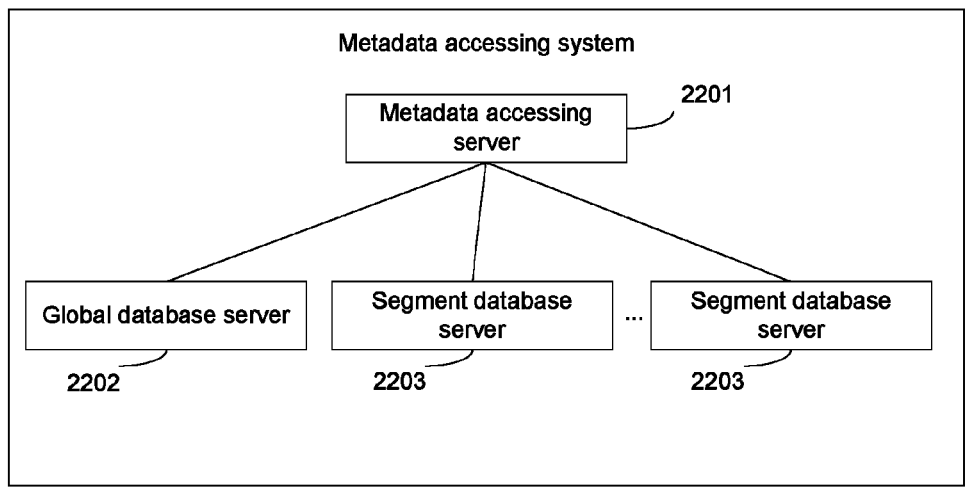
FIG. 22 is a schematic diagram illustrating a system for accessing metadata according to embodiment 10 of the present disclosure.

This embodiment provides a metadata accessing system. As shown in FIG. 22, the system includes a metadata accessing server 2201, a global database server 2202 and at least one segment database server 2203;

the metadata accessing server 2201 has a network connection with the global database server 2202 and respective segment database server 2203;

the global database server stores authentication information of metadata, and table information of the metadata is stored in one or more segment database servers 2203, the at least one segment database server 2203 and the global database servers are different servers; and the metadata accessing server 2201 receives an authentication information query request containing a metadata identifier transmitted by a query engine, and transmits the authentication information query request to the global database server 2202; receives the authentication information corresponding to the metadata identifier transmitted by the global database server 2202, and transmits the authentication information to the query engine, such that the query engine determines according to a privilege authentication result of the authentication information whether to access table information corresponding to the metadata identifier.

The metadata accessing data 2201 may be as described in the above embodiment 4 or 5. The details may be seen from embodiment 4 or 5 and are not repeated herein.

The global database server 2202 may be as described in the above embodiment 6 or 7. The details may be seen from embodiment 6 or 7 and are not repeated herein.

The segment database server 2203 may be as described in the above embodiment 8 or 9. The details may be seen from embodiment 8 or 9 and are not repeated herein.

According to the system provided by the embodiments of the present disclosure, through storing the authentication information of the metadata in the global database server and storing the table information of the metadata in one or more segment database servers, distributed storage of the metadata is realized. The metadata accessing server obtains the authentication information queried by the query engine from the global database server and obtains the table information queried by the query engine from the segment database server. Thus, the time for accessing the metadata is reduced, and then the speed for sharing and exchanging information in the distributed data warehouse is increased.

It should be noted that, the metadata accessing server, the global database server and the at least one segment database server provided by the embodiments of the present disclosure are described by taking the above functional modules as an example. In practical application, the above functions may be assigned to different functional modules, i.e., the internal structure of a server may be divided into different functional modules to accomplish some or all of the above functions. In addition, the metadata accessing server, the global database server and the segment database servers provided by the above embodiments of the present disclosure belong to the same idea as the method for accessing metadata. The details may be seen in the method embodiments and not repeated herein.

The sequence numbers of the embodiments are merely used for facilitating the description and do not denote any preference to the embodiments.

Those skilled in the art would know that some or all processes of the embodiments of the present disclosure may be implemented by hardware, or may be implemented by a program running on a relevant hardware. The program may be stored in a computer readable storage medium. The storage medium may be a read-only memory, disk, compact disk, etc.

What has been described and illustrated herein is an example of the disclosure along with some of its variations. The terms, descriptions and figures used herein are set forth by way of illustration. Many variations are possible within the spirit and scope of the disclosure, which is intended to be defined by the following claims and their equivalents.

The invention claimed is:

1. A method for accessing metadata, comprising:

receiving, by a metadata accessing server, an authentication information query request containing a metadata identifier transmitted by a query engine, and transmitting the authentication information query request to a global database server storing authentication information of metadata, wherein the global database server searches for authentication information corresponding to the metadata identifier in the authentication information query request, and transmits the authentication information corresponding to the metadata identifier to the metadata accessing server;

receiving, by the metadata accessing server, the authentication information corresponding to the metadata identifier transmitted by the global database server;

transmitting, by the metadata accessing server, the authentication information to the query engine, wherein the query engine determines whether to access table information corresponding to the metadata identifier according to a privilege authentication result of the authentication information;

wherein table information of the metadata is stored in one or more segment database servers, and the one or more segment database servers and the global database server are different servers.

2. The method of claim 1, further comprising:

receiving a table information access request containing the metadata identifier transmitted by the query engine;

transmitting the table information access request to a segment database server storing the table information corresponding to the metadata identifier;

receiving the table information transmitted by the segment database server storing the table information corresponding to the metadata identifier; and transmitting the table information to the query engine.

3. The method of claim 2, wherein the transmitting the table information access request to the segment database server storing the table information corresponding to the metadata identifier comprises:

determining a name of a database corresponding to the metadata identifier;

calculating a hash value of the name of the database corresponding to the metadata identifier;

determining a region that the calculated hash value belongs to, and finding the segment database server corresponding to the region that the calculated hash value belongs to according to a mapping table between regions and the segment database servers; and transmitting the table information access request to the found segment database server.

4. The method of claim 3, further comprising:

determining the number of the segment database servers;

dividing an integer interval of a predefined length into the same number of regions as the segment database servers;

mapping respective region to one segment database server, and creating the mapping table between the regions and the segment database servers based on a correspondence between respective region and the corresponding segment database server.

5. The method of claim 4, further comprising:

selecting an existing segment database server, dividing the region corresponding to the selected segment database server into at least two sub-regions;

respectively mapping the sub-regions to the selected segment database server and newly added segment database server(s); and updating the mapping table between the regions and the segment database servers according to the correspondence between respective region and the corresponding segment database server.

6. The method of claim 1, further comprising:

determining the global database server and a predefined number of the segment database servers, and determining the database corresponding to respective segment database server; and storing the authentication information of the metadata in the global database server, and storing the table information of the metadata in the segment database server corresponding to the database that the table information belongs to.

7. A metadata accessing server, comprising:

a first receiving module, adapted to receive an authentication information query request containing a metadata identifier transmitted by a query engine;

a first transmitting module, adapted to transmit the authentication information query request received by the first receiving module to a global database server storing authentication information of metadata; wherein the global database server searches for authentication information corresponding to the metadata identifier in the authentication information query request, and transmits the authentication information corresponding to the metadata identifier to the metadata accessing server;

a second receiving module, adapted to receive the authentication information corresponding to the metadata identifier transmitted by the global database server;

a second transmitting module, adapted to transmit the authentication information received by the second receiving module to the query engine, wherein the query engine determines whether to access table information corresponding to the metadata identifier according to a privilege authentication result of the authentication information;

wherein table information of the metadata is stored in one or more segment database servers, the one or more segment database servers and the global database server are different servers.

8. The metadata accessing server of claim 7, further comprising:
- a third receiving module, adapted to receive a table information access request containing the metadata identifier transmitted by the query engine;
- a third transmitting module, adapted to transmit the table information access request received by the third receiving module to a segment database server storing the table information corresponding to the metadata identifier;
- a fourth receiving module, adapted to receive the table information transmitted by the segment database server storing the table information corresponding to the metadata identifier; and
- a fourth transmitting module, adapted to transmit the table information received by the fourth receiving module to the query engine.

9. The metadata accessing server of claim 8, wherein the third transmitting module comprising:
- a first determining unit, adapted to determine the name of a database corresponding to the metadata identifier;
- a calculating unit, adapted to calculate a hash value of the name of the database corresponding to the metadata identifier determined by the first determining unit;
- a second determining unit, adapted to determine a region that the calculated hash value belongs to;
- a searching unit, adapted to search a predefined mapping table between regions and segment database servers for a segment database server corresponding to the region that the hash value calculated by the calculating unit belongs to;
- a third determining unit, adapted to determine the segment database server found by the searching unit; and
- a transmitting unit, adapted to transmit the table information access request to the segment database server determined by the third determining unit.

10. The metadata accessing server of claim 9, further comprising:
- a first determining module, adapted to determine the number of the segment database servers;
- a first dividing module, adapted to divide an integer interval of a predefined length into the same number of regions as the segment database servers;
- a first mapping module, adapted to map each region to one segment database server; and
- a creating module, adapted to create a mapping table between the regions and the segment database servers according to a correspondence between respective region and the corresponding segment database server.

11. The metadata accessing server of claim 10, further comprising:
- a selecting module, adapted to select an existing segment database server;
- a second dividing module, adapted to divide the region corresponding to the segment database server selected by the selecting module into at least two sub-regions;
- a second mapping module, adapted to map the sub-regions respectively to the selected segment database server and one or more newly added segment database servers; and
- an updating module, adapted to update the predefined mapping table between the regions and the segment database servers according to the correspondence between respective region and the corresponding segment database server.

12. The metadata accessing server of claim 7, further comprising:
- a second determining module, adapted to determine the global database server and a predefined number of segment database servers;
- a third determining module, adapted to determine a database corresponding to each segment database server;
- a first storage module, adapted to store the authentication information of the metadata in the global database server; and
- a second storage module, adapted to store the table information of the metadata in the segment database server corresponding to the database that the table information belongs to.

13. A metadata accessing server, comprising: one or more processors and a memory, one or more programs are stored in the memory and are configured to be executable by the one or more processors, wherein the one or more programs comprise instructions for performing the acts of:
- receiving an authentication information query request containing a metadata identifier transmitted by a query engine, and transmitting the authentication information query request to a global database server storing authentication information of metadata; wherein the global database server searches for authentication information corresponding to the metadata identifier in the authentication information query request, and transmits the authentication information corresponding to the metadata identifier to the metadata accessing server;
- receiving the authentication information corresponding to the metadata identifier transmitted by the global database server;
- transmitting the authentication information to the query engine, wherein the query engine determined whether to access table information corresponding to the metadata identifier according to a privilege authentication result of the authentication information;
- wherein table information of the metadata is stored in one or more segment database servers; and the one or more segment database servers and the global database server are different servers.

* * * * *